UNITED STATES PATENT OFFICE 1,929,560

AGE RESISTING RUBBER AND RUBBER COMPOUNDS

Harold A. Morton, Akron, Ohio

No Drawing. Application July 14, 1928
Serial No. 292,906

43 Claims. (Cl. 18—50)

My invention relates to rubber or rubber-like compounds and its object is primarily to increase the age-resisting qualities thereof.

The invention consists in the introduction into the compound prior to vulcanization, or the application to a vulcanized article, of an appropriate derivative of hydroglyoxaline.

There are a great number of these derivatives which function as anti-oxidants, some of which possess material accelerating properties when introduced into a rubber compound, and others of which exhibit negligible accelerating properties, and both are within the purview of my invention, broadly considered.

Such derivatives which do not exhibit accelerating properties are of special importance under certain factory conditions, since they may be used without materially affecting factory procedure or changing the rate of cure of an established or selected compound.

There are a great number of such hydroglyoxaline derivatives which function as anti-oxidants. All these derivatives are designated in this specification by the accustomed nomenclature now in general use. The basic material, glyoxaline, from which these substances are derived, is usually given the following chemical constitution:

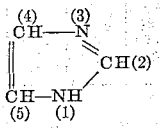

The substances described in this specification are hydroglyoxalines or substituted hydroglyoxalines.

Substituted di hydroglyoxalines in general may be used and as an example, 2-4-5 triphenyl di hydroglyoxaline may be noted, the chemical formula of which is:

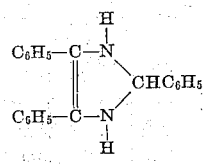

Other examples are 2-4-5 trifuryl di hydroglyoxaline and 2-4-5 tritolyl di hydroglyoxaline.

Typical rubber-like compounds, or mixtures, having one of the described anti-oxidant agents incorporated therein, are as follows:

| Compound | A | B |
|---|---|---|
| Rubber | 55.8 | 55.8 |
| Zinc oxide | 11.55 | 11.55 |
| Sulphur | 2.25 | 2.25 |
| Mineral oil | 5.0 | 3.50 |
| Carbon black | 24.0 | 24.0 |
| Diphenyl guanidine | 0.4 | 0.4 |
| 2-4-5 trifuryl di hydroglyoxaline | 0. | 1.5 |
|  | 100.00 | 100.00 |

Slabs are cured in the press for periods of 70 minutes and 90 minutes at 40 pounds steam pressure and test strips were then cut out and tested for aging qualities, both by the "oxygen bomb" method and "hot oven" method.

"*Oxygen bomb test*"—*48 hrs. x 60° C. x 300#*

| Compound | Cure—75' x 40# | | | | Cure—90' x 40# | | | |
|---|---|---|---|---|---|---|---|---|
|  | Tensile | | Elongation | | Tensile | | Elongation | |
|  | Orig. | Final | Orig. | Final | Orig. | Final | Orig. | Final |
|  |  |  | Percent | Percent |  |  | Percent | Percent |
| A | 3815 | 1595 | 730 | 550 | 3700 | 1570 | 720 | 530 |
| B | 3815 | 2690 | 700 | 590 | 3720 | 2410 | 700 | 590 |

"*Hot oven*"—*temperature 150° C.*

| Days in oven | Cure 75' x 40# | | | | Cure 90' x 40# | | | |
|---|---|---|---|---|---|---|---|---|
|  | Stock A | | Stock B | | Stock A | | Stock B | |
|  | Tens. | Elong. | Tens. | Elong. | Tens. | Elong. | Tens. | Elong. |
|  |  | Percent |  | Percent |  | Percent |  | Percent |
| Orig | 3815 | 730 | 3815 | 700 | 3700 | 720 | 3720 | 700 |
| 2 days | 3695 | 690 | 3110 | 610 | 3625 | 660 | 3590 | 620 |
| 10 days | 2660 | 550 | 3150 | 560 | 2510 | 500 | 3210 | 560 |
| 17 days | 2130 | 500 | 2950 | 500 | 2145 | 440 | 2900 | 480 |
| 24 days | 1685 | 410 | 2630 | 490 | 1620 | 370 | 2520 | 440 |

It is to be noted that both methods of accelerated aging show that the compounds containing 2-4-5 trifuryl dihydroglyoxaline age in a much superior manner to the compound not containing this material.

It is also within the purview of this invention to use derivatives of di hydroglyoxaline wherein the double bond between the 4-5 carbon atoms has been saturated by hydrogen; for example, 1-3 diphenyl tetra hydroglyoxaline may be used, the formula for which is:

This material may be prepared by heating 1-2 di (phenyl amino) ethane with formaldehyde.

Similar materials are:

1-3 di ortho tolyl tetra hydroglyoxaline,
1-3 di para tolyl tetra hydroglyoxaline,
1-3 di xylyl tetra hydroglyoxaline,
1-3 di alpha naphthyl tetra hydroglyoxaline,
1 phenyl 3-ortho tolyl tetra hydroglyoxaline,
1 phenyl 3-alpha naphthyl tetra hydroglyoxaline,
1-3 di phenyl 2-propyl tetra hydroglyoxaline,
1-3 diphenyl 2-vinyl tetra hydroglyoxaline,
1-3 diphenyl 2-methyl tetra hydroglyoxaline,
1-3 diphenyl 2-propenyl tetra hydroglyoxaline,
1-3 diphenyl 4-pseudo butyl tetra hydroglyoxaline,
1-3 diphenyl 2-furyl tetra hydroglyoxaline,
1-3 diphenyl 2-hexyl tetra hydroglyoxaline,
1-2 diphenyl 3-beta naphthyl tetra hydroglyoxaline,
1 phenyl 3-beta naphthyl 2-furyl tetra hydroglyoxaline,
1-3 di alpha naphthyl 2-propyl tetra hydroglyoxaline,
1-2-3 triphenyl tetra hydroglyoxaline,
1-3 diphenyl 2-methoethyl tetra hydroglyoxaline,
1-3 di ortho tolyl 2-propyl tetra hydroglyoxaline,
1-3 di para tolyl 2-methyl tetra hydroglyoxaline,
1-3 di xylyl 2-furyl tetra hydroglyoxaline,
1-3 di alpha naphthyl 2-propenyl tetra hydroglyoxaline,
1-3 di alpha naphthyl 2-phenyl tetra hydroglyoxaline,
1-3 diphenyl 3-thio tetra hydroglyoxaline,
1 phenyl 3-para tolyl 2-thio tetra hydroglyoxaline,
1 ortho tolyl 3-xylyl 2-thio tetra hydroglyoxaline,
1-3 di para tolyl 2-phenyl tetra hydroglyoxaline,
1-3 di beta naphthyl 2-methyl tetra hydroglyoxaline,
1 phenyl 3-ortho tolyl 2-propyl tetra hydroglyoxaline,
1-3 diphenyl 4-methyl tetra hydroglyoxaline,
1-3 di ortho tolyl 4-methyl tetra hydroglyoxaline,
1-3 di para tolyl 4-methyl tetra hydroglyoxaline,
1-3 di xylyl 4-methyl tetra hydroglyoxaline,
1-3 di alpha naphthyl 4-methyl tetra hydroglyoxaline,
1-3 di beta naphthyl 4-methyl tetra hydroglyoxaline,
1-3 diphenyl 4-ethyl tetra hydroglyoxaline,
1-3 di para tolyl 4-ethyl tetra hydroglyoxaline,
1-3 di alpha naphthyl 2-methyl tetra hydroglyoxaline, 1-3 diphenyl 2-propyl tetra hydroglyoxaline, the chemical formula being:

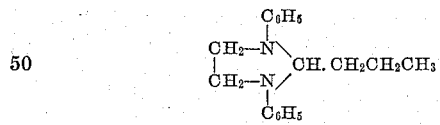

1-3 diphenyl 2-propyl tetra hydroglyoxaline can be prepared by heating 100 parts of 1-2 di (phenyl amino) ethane dissolved in alcohol with 40 parts of butyric aldehyde under reflux for several hours. Upon cooling and crystallizing there is obtained a cream-colored solid, which is dried and is then ready for use.

To illustrate the use of 1-3 di alpha naphthyl tetra hydroglyoxaline in a black stock accelerated by diphenyl guanidine, the following rubber batches were compounded and mixed, the quantities being expressed in parts per hundred:

| Compound | A | B |
|---|---|---|
| Rubber | 56.8 | 55.8 |
| Zinc oxide | 16.5 | 16.5 |
| Sulphur | 2.25 | 2.25 |
| Mineral oil | 4.0 | 3.5 |
| Carbon black | 20. | 20.0 |
| Diphenyl guanidine | 0.45 | 0.45 |
| 1-3 di alpha naphthyl tetra hydroglyoxaline | 0.0 | 1.5 |
| | 100.00 | 100.00 |

An accelerated hot oven test was made on the above stocks cured in a press for 70 and 90 minutes at 40 pounds steam pressure. The results are as follows:

| Days in oven at 150° C. | Compound A | | | | Compound B | | | |
|---|---|---|---|---|---|---|---|---|
| | 70' x 40# | | 90' x 40# | | 70' x 40# | | 90' x 40# | |
| | Tens. | Elong. | Tens. | Elong. | Tens. | Elong. | Tens. | Elong. |
| | | Percent | | Percent | | Percent | | Percent |
| Orig | 4090 | 680 | 3805 | 650 | 3720 | 670 | 3840 | 660 |
| 2 | 3560 | 610 | 3790 | 640 | 4850 | 640 | 4110 | 610 |
| 10 | 3100 | 600 | 3100 | 540 | 3590 | 600 | 4300 | 580 |
| 17 | 2560 | 530 | 2240 | 490 | 3220 | 550 | 3190 | 510 |
| 27 | 1620 | 350 | 1494 | 390 | 2660 | 420 | 2500 | 400 |

To illustrate the use of 1-3 diphenyl 2-propyl tetra hydroglyoxaline in a black compounded stock accelerated by diphenyl guanidine, the following mixtures were prepared:

| Compound | A | B |
|---|---|---|
| Rubber | 56.8 | 55.8 |
| Zinc oxide | 16.5 | 16.5 |
| Sulphur | 2.25 | 2.25 |
| Mineral oil | 4.0 | 3.5 |
| Carbon Black | 20.0 | 20.0 |
| Diphenyl guanidine | 0.45 | 0.45 |
| 1-3 diphenyl 2-propyl tetra hydroglyoxaline | 0. | 1.5 |
| | 100.00 | 100.00 |

Slabs were cured in a press for 80 and 100 minutes at 40 pounds steam pressure and test strips were then cut out and tested for aging qualities both by the "oxygen bomb" method and the "hot oven" method.

"Oxygen bomb test"—48 hrs. x 60° C. x 300# oxygen

| Compound | Cure 80' x 40# | | | | Cure 100' x 40# | | | |
|---|---|---|---|---|---|---|---|---|
| | Tensile | | Elongation | | Tensile | | Elongation | |
| | Orig. | Final | Orig. | Final | Orig. | Final | Orig. | Final |
| | | | Percent | Percent | | | Percent | Percent |
| A | 3290 | 1025 | 620 | 400 | 3380 | 880 | 600 | 380 |
| B | 3300 | 1970 | 630 | 510 | 3340 | 1950 | 620 | 500 |

"Hot oven age test"—temperature 150° F.

| Days in oven | Cure 80' x 40# | | | | Cure 100' x 40# | | | |
|---|---|---|---|---|---|---|---|---|
| | Stock A | | Stock B | | Stock A | | Stock B | |
| | Tens. | Elong. | Tens. | Elong. | Tens. | Elong. | Tens. | Elong. |
| | | Percent | | Percent | | Percent | | Percent |
| Orig | 3045 | 610 | 3100 | 620 | 3135 | 650 | 3195 | 670 |
| 3 | 2990 | 570 | 3175 | 620 | 2820 | 560 | 3120 | 620 |
| 6 | 2700 | 560 | 3050 | 550 | 2425 | 510 | 3040 | 600 |
| 9 | 2305 | 530 | 2900 | 540 | 2130 | 470 | 2920 | 570 |
| 12 | 2010 | 480 | 2780 | 540 | 1910 | 460 | 2710 | 540 |
| 15 | 1815 | 470 | 2425 | 490 | 1610 | 440 | 2470 | 540 |

To illustrate the use of 1-3 di para tolyl 2-phenyl tetra hydroglyoxaline, the following rubber mixtures were prepared, the quantities being expressed in parts per hundred:

| Compound | A | B |
|---|---|---|
| Rubber | 56.8 | 56.8 |
| Zinc oxide | 11.55 | 11.55 |
| Sulphur | 2.25 | 2.25 |
| Mineral oil | 5.0 | 3.5 |
| Carbon black | 24.0 | 24.0 |
| Alpha ethyl beta propyl acryl aniline | 0.4 | 0.4 |
| 1-3 di para tolyl 2-phenyl tetra hydroglyoxaline | 0. | 1.5 |
|  | 100.00 | 100.00 |

Slabs were cured in the press for periods of 70 and 90 minutes at 40 pounds steam pressure and test strips were then cut and tested for aging qualities both by the "oxygen bomb" method and the "hot oven" method.

"Oxygen bomb test"—48 hrs. x 60° C. x 300# oxygen

| Compound | Cure 70' x 40# | | | | Cure 90' x 40# | | | |
|---|---|---|---|---|---|---|---|---|
|  | Tensile | | Elongation | | Tensile | | Elongation | |
|  | Orig. | Final. | Orig. | Final. | Orig. | Final. | Orig. | Final |
|  |  |  | Percent | Percent |  |  | Percent | Percent |
| A | 3305 | 1135 | 700 | 440 | 3560 | 995 | 680 | 390 |
| B | 3265 | 2540 | 620 | 550 | 3620 | 2465 | 610 | 520 |

"Hot oven age test"—temperature 150° F.

| Days in oven | Cure 70' x 40# | | | | Cure 90' x 40# | | | |
|---|---|---|---|---|---|---|---|---|
|  | Stock A | | Stock B | | Stock A | | Stock B | |
|  | Tens. | Elong. | Tens. | Elong. | Tens. | Elong. | Tens. | Elong. |
|  |  | Percent |  | Percent |  | Percent |  | Percent |
| Orig | 3305 | 700 | 3265 | 620 | 3560 | 680 | 3620 | 610 |
| 2 | 3490 | 660 | 3410 | 600 | 3580 | 650 | 3560 | 540 |
| 14 | 2480 | 570 | 3280 | 590 | 2410 | 500 | 3130 | 530 |
| 21 | 1900 | 500 | 3000 | 540 | 1840 | 430 | 2310 | 470 |
| 28 | 1690 | 400 | 2610 | 470 | 1680 | 350 | 2220 | 420 |
| 35 | 1280 | 350 | 2350 | 480 | 1230 | 260 | 2140 | 400 |

The use of 1-3 diphenyl 2-propenyl tetra hydroglyoxaline is illustrated in this example:

| Compound | A | B |
|---|---|---|
| Rubber | 55.8 | 55.8 |
| Zinc oxide | 12.5 | 12.5 |
| Sulphur | 2.25 | 2.25 |
| Mineral oil | 5.0 | 3.5 |
| Carbon black | 24.0 | 24.0 |
| Diphenyl guanidine | 0.45 | 0.45 |
| 1-3 diphenyl 2-propenyl tetra hydroglyoxaline | 0. | 1.5 |
|  | 100.00 | 100.00 |

Slabs were cured in the press for periods of 70 and 90 minutes at 40 pounds and test strips were then cut out and tested for aging qualities both by the "oxygen bomb" method and the "hot oven" method.

"Oxygen bomb test"—48 hrs. x 60° C. x 300# oxygen

| Compound | Cure 70' x 40# | | | | Cure 90' x 40# | | | |
|---|---|---|---|---|---|---|---|---|
|  | Tensile | | Elongation | | Tensile | | Elongation | |
|  | Orig. | Final. | Orig. | Final. | Orig. | Final. | Orig. | Final |
|  |  |  | Percent | Percent |  |  | Percent | Percent |
| A | 3910 | 1280 | 700 | 520 | 3800 | 1070 | 700 | 460 |
| B | 3900 | 2845 | 710 | 660 | 3725 | 2735 | 700 | 630 |

"Hot oven test"—temperature 150° C.

| Days in oven | Cure 70' x 40# | | | | Cure 90' x 40# | | | |
|---|---|---|---|---|---|---|---|---|
|  | Stock A | | Stock B | | Stock A | | Stock B | |
|  | Tens. | Elong. | Tens. | Elong. | Tens. | Elong. | Tens. | Elong. |
|  |  | Percent |  | Percent |  | Percent |  | Percent |
| 0 | 3910 | 700 | 3900 | 710 | 3800 | 700 | 3825 | 700 |
| 2 | 3960 | 700 | 3870 | 700 | 3570 | 640 | 3835 | 680 |
| 10 | 3160 | 570 | 3580 | 650 | 2760 | 520 | 3530 | 650 |
| 14 | 2025 | 460 | 3350 | 650 | 2205 | 440 | 3210 | 540 |
| 18 | 1580 | 450 | 2670 | 560 | 1515 | 350 | 2510 | 470 |
| 20 | 1205 | 310 | 2245 | 450 | 1005 | 200 | 2000 | 390 |

As a further example the use of 1-3 di para tolyl 2-methyl tetra hydroglyoxaline is given below:

| Compound | A | B |
|---|---|---|
| Rubber | 55.8 | 55.8 |
| Zinc oxide | 12.5 | 12.5 |
| Sulphur | 2.25 | 2.25 |
| Mineral oil | 5.0 | 3.5 |
| Carbon black | 24.0 | 24.0 |
| Diphenyl guanidine | 0.45 | 0.45 |
| 1-3 di para tolyl 2-methyl tetra hydroglyoxaline | 0. | 1.5 |
|  | 100.00 | 100.00 |

Slabs were cured in the press for periods of 70 and 90 minutes at 40 pounds and test strips were then cut out and tested for aging qualities both by the "oxygen bomb" method and by the "hot oven" method.

"Oxygen bomb test"—48 hrs. x 60° C. x 300# pressure

| Compound | Cure 70' x 40# | | | | Cure 90' x 40# | | | |
|---|---|---|---|---|---|---|---|---|
|  | Tensile | | Elongation | | Tensile | | Elongation | |
|  | Orig. | Final. | Orig. | Final. | Orig. | Final. | Orig. | Final |
|  |  |  | Percent | Percent |  |  | Percent | Percent |
| A | 3910 | 1280 | 700 | 520 | 3800 | 1070 | 700 | 460 |
| B | 3730 | 2870 | 730 | 670 | 3820 | 2800 | 710 | 630 |

"Hot oven age test"—temperature 150° F.

| Days in oven | Cure 70' x 40# | | | | Cure 90' x 40# | | | |
|---|---|---|---|---|---|---|---|---|
|  | Stock A | | Stock B | | Stock A | | Stock B | |
|  | Tens. | Elong. | Tens. | Elong. | Tens. | Elong. | Tens. | Elong. |
|  |  | Percent |  | Percent |  | Percent |  | Percent |
| 0 | 3910 | 700 | 3730 | 730 | 3800 | 700 | 3820 | 710 |
| 2 | 3960 | 700 | 3935 | 720 | 3570 | 640 | 3775 | 670 |
| 10 | 3160 | 570 | 3860 | 680 | 2760 | 520 | 3570 | 660 |
| 18 | 2025 | 460 | 3480 | 650 | 2205 | 440 | 3260 | 610 |
| 28 | 2050 | 500 | 2800 | 620 | 1515 | 350 | 2640 | 560 |

As an example of the use of a thio tetra hydroglyoxaline, the following rubber mixtures were prepared, the quantities being expressed in parts per hundred:

| Compound | A | B |
|---|---|---|
| Rubber | 56.8 | 56.8 |
| Zinc oxide | 11.5 | 11.5 |
| Sulphur | 2.25 | 2.25 |
| Mineral oil | 5.0 | 3.5 |
| Carbon black | 24.0 | 24.0 |
| Diphenyl guanidine | 0.45 | 0.45 |
| 1 phenyl 3-xylyl 2-thio tetra hydroglyoxaline | 0. | 1.5 |
| | 100.00 | 100.00 |

Slabs were cured in a press for periods of 70 minutes and 90 minutes at 40 pounds steam pressure and strips were then cut out and tested for aging qualities.

"Oxygen bomb test"—48 hrs. x 60° C. x 300# Oxygen

| Compound | Cure 70' x 40# | | | | Cure 90' x 40# | | | |
|---|---|---|---|---|---|---|---|---|
| | Tensile | | Elongation | | Tensile | | Elongation | |
| | Orig. | Final | Orig. | Final | Orig. | Final | Orig. | Final |
| A | 3325 | 1385 | 730 Percent | 570 Percent | 3455 | 1370 | 740 Percent | 540 Percent |
| B | 3470 | 2825 | 700 | 560 | 3460 | 2790 | 700 | 650 |

"Hot oven test"—temperature 150° C.

| Days in oven | Cure 70' x 40# | | | | Cure 90' x 40# | | | |
|---|---|---|---|---|---|---|---|---|
| | Stock A | | Stock B | | Stock A | | Stock B | |
| | Tens. | Elong. | Tens. | Elong. | Tens. | Elong. | Tens. | Elong. |
| Orig. | 3325 | 730 Percent | 3470 | 700 Percent | 3455 | 740 Percent | 3460 | 700 Percent |
| 3 | 3390 | 710 | 3730 | 700 | 3245 | 670 | 3785 | 690 |
| 12 | 2380 | 560 | 3645 | 670 | 2310 | 510 | 3420 | 620 |
| 19 | 1650 | 490 | 3090 | 630 | 1485 | 420 | 3030 | 590 |
| 26 | 1145 | 400 | 2740 | 580 | 1020 | 350 | 2640 | 540 |
| 33 | 800 | 270 | 2490 | 550 | 925 | 220 | 2290 | 490 |

It is also within the scope of my invention to use derivatives of tetra hydroglyoxaline in which one or more of the hydrogen atoms attached to the carbon atoms in the 4-5 position is replaced by an organic group.

As an example, I note 1-3 diphenyl 2-propyl 4-methyl tetra hydroglyoxaline, the chemical formula for which is:

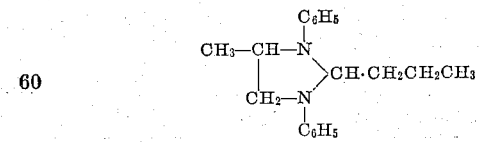

Similar substances are:
1-3 diphenyl 2-4-dimethyl tetra hydroglyoxaline,
1-3 diphenyl 2-vinyl 4-methyl tetra hydroglyoxaline,
1-3 diphenyl 2-propenyl 4-methyl tetra hydroglyoxaline,
1-3 diphenyl 2-furyl 4-methyl tetra hydroglyoxaline,
1-3 diphenyl 2-hexyl 4-methyl tetra hydroglyoxaline,
1-3 diphenyl 2-methoethyl 4-methyl tetra hydroglyoxaline,
1-2-3 triphenyl 4-methyl tetra hydroglyoxaline,
1-3 di ortho tolyl 2-4-dimethyl tetra hydroglyoxaline,
1-3 di para tolyl 2-propyl 4-methyl tetra hydroglyoxaline,
1-3 di xylyl 2-furyl 4-methyl tetra hydroglyoxaline,
1-3 di alpha naphthyl 2-phenyl 4-methyl tetra hydroglyoxaline,
1-3 beta naphthyl 2-propenyl 4-methyl tetra hydroglyoxaline,
1-3 diphenyl 4-5-dimethyl tetra hydroglyoxaline,
1-3 diphenyl 2-methyl 4-ethyl tetra hydroglyoxaline,
1-3 di ortho tolyl 2-vinyl 4-ethyl tetra hydroglyoxaline,
1-3 di xylyl 2-propyl 4-ethyl tetra hydroglyoxaline,
1-3 di alpha naphthyl 2-phenyl 4-ethyl tetra hydroglyoxaline,
1-3 di phenyl 2-thio 4-methyl tetra hydroglyoxaline,
1-3 di ortho tolyl 2-thio 4-methyl tetra hydroglyoxaline,
1-3 di beta naphthyl 2-phenyl 4-methyl tetra hydroglyoxaline,
1-3 diphenyl 4-4-dimethyl tetra hydroglyoxaline,
1-3 di ortho tolyl 4-4-dimethyl tetra hydroglyoxaline,
1-3 di para tolyl 4-4-dimethyl tetra hydroglyoxaline,
1-3 di xylyl 4-4-dimethyl tetra hydroglyoxaline,
1-3 di alpha naphthyl 4-4-dimethyl tetra hydroglyoxaline,
1-3 di beta naphthyl 4-4-dimethyl tetra hydroglyoxaline,
1-3 diphenyl 2-propyl 4-pseudo butyl tetra hydroglyoxaline,
1-3 diphenyl 2-4-5 trimethyl tetra hydroglyoxaline,
1-3 diphenyl 2-propenyl 4-5-dimethyl tetra hydroglyoxaline,
1-3 diphenyl 2-propyl 4-5-dimethyl tetra hydroglyoxaline,
1-3 diphenyl 2-furyl 4-5-dimethyl tetra hydroglyoxaline,
1-2-3 triphenyl 4-5-dimethyl tetra hydroglyoxaline,
1-3 diphenyl 2-vinyl 4-5-dimethyl tetra hydroglyoxaline,
1-3 di ortho tolyl 2-furyl 4-5-dimethyl tetra hydroglyoxaline,
1-3 di para tolyl 2-phenyl 4-5-dimethyl tetra hydroglyoxaline,
1-3 di xylyl 2-vinyl 4-5-dimethyl tetra hydroglyoxaline,
1-3 di alpha naphthyl 2-propyl 4-5-dimethyl tetra hydroglyoxaline,
1-3 di beta naphthyl 2-4-5-trimethyl tetra hydroglyoxaline,
1-3 diphenyl 2-4-4-trimethyl tetra hydroglyoxaline,
1-3 diphenyl 2-vinyl 4-4-dimethyl tetra hydroglyoxaline,
1-2-3 triphenyl 4-4-dimethyl tetra hydroglyoxaline,
1-3 di ortho tolyl 2-propyl 4-4-dimethyl tetra hydroglyoxaline,
1-3 diphenyl 4-4-5-trimethyl tetra hydroglyoxaline,
1-3 diphenyl 2-thio 4-5-dimethyl tetra hydroglyoxaline.

To illustrate the use of 1-3 di beta naphthyl 2-phenyl 4-methyl tetra hydroglyoxaline the following example is given:

| Compound | A | B |
|---|---|---|
| Rubber | 56.8 | 56.8 |
| Zinc oxide | 11.5 | 11.5 |
| Sulphur | 2.25 | 2.25 |
| Mineral oil | 5.0 | 3.5 |
| Carbon black | 24.0 | 24.0 |
| Diphenyl guanidine | 0.45 | 0.45 |
| 1-3 di beta naphthyl 2-phenyl 4-methyl tetra hydroglyoxaline | 0. | 1.5 |
| | 100.00 | 100.00 |

Slabs were cured in a press for periods of 70 and 90 minutes at 40 pounds steam pressure and strips were then cut out and tested for aging qualities. The results are as follows:

"Oxygen bomb test"—48 hrs. x 60° C. x 300# oxygen

| Compound | Cure 70' x 40# | | | | Cure 90' x 40# | | | |
|---|---|---|---|---|---|---|---|---|
| | Tensile | | Elongation | | Tensile | | Elongation | |
| | Orig. | Final | Orig. | Final | Orig. | Final | Orig. | Final |
| A | 4125 | 985 | 690 Percent | 430 Percent | 3795 | 885 | 650 Percent | 400 Percent |
| B | 4040 | 2955 | 680 | 610 | 3785 | 2320 | 620 | 570 |

"Hot oven test"—temperature 150° C.

| Days in oven | Cure 70' x 40# | | | | Cure 90' x 40# | | | |
|---|---|---|---|---|---|---|---|---|
| | Stock A | | Stock B | | Stock A | | Stock B | |
| | Tens. | Elong. | Tens. | Elong. | Tens. | Elong. | Tens. | Elong. |
| Orig. | 4125 | 690 Percent | 4040 | 680 Percent | 3795 | 650 Percent | 3785 | 620 Percent |
| 2 | 3780 | 660 | 4125 | 640 | 3660 | 630 | 3580 | 580 |
| 12 | 2360 | 520 | 3360 | 570 | 2230 | 500 | 3060 | 530 |
| 20 | 1705 | 490 | 3080 | 550 | 1510 | 420 | 2890 | 510 |

While the materials cited above are the free bases, it is also possible to use salts of these materials without materially affecting the anti-oxidant value. In other words, the effect of protecting against deterioration, shown by the hydroglyoxaline constitution, still holds true when this material is combined to form a salt.

The tetra hydroglyoxaline derivatives referred to in this specification are prepared, in general, by the action of aldehydes on the corresponding 1-2 diamino ethane derivative and are considered to have the chemical constitution as given. However, I do not wish to be bound by any of the theories or formulæ given, but desire to protect the class of materials formed in this manner.

The thio tetra hydroglyoxaline derivatives are prepared, in general, by the action of thio carbonyl chloride on the corresponding 1-2 diamino ethane derivative, and are considered to have the chemical constitution as given. However, I do not wish to be bound by this constitution but desire to claim that class of materials formed by the reaction of thio carbonyl chloride and 1-2 diamino ethane derivatives.

In general, the most beneficial effect is obtained by using at least 1%-1.5% of the material in the rubber compound, and the aging quality of the goods is, up to a certain point at least, a function of the quantity of the material employed.

It has also been found possible to add the material after the rubber stock has been vulcanized and still obtain appreciable improvement in the aging qualities of the stock. This may be done by painting or dipping the rubber stock with a solution of the desired material and, after allowing penetration to take place, to dry off the surplus solvent.

By the term derivative, as used in this specification and claims, it is not intended to include salts formed from strong acids which in themselves are highly deleterious to the aging of rubber.

As indicated in the foregoing examples, the C atom in the 2 position of substituted 2-3 di hydroglyoxaline (or of substituted 2-3-4-5 tetra hydroglyoxaline) may have attached thereto any of the following: H, S, $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic, aromatic, or mixed aliphatic-aromatic groups, whether saturated or unsaturated. These radicals I consider members of the class which may be designated, and in some of the appended claims are identified, by the term "2 modifying group."

Independently of the special member which may be used as a 2 modifying group, one or more of the hydrogen atoms which are attached to the nitrogen atoms in the 1-3 positions may be replaced by any of the following: $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic, aromatic, or mixed aliphatic-aromatic group, whether saturated or unsaturated. These radicals I consider members of a class which may be designated, and in some of the appended claims are identified, by the term "1-3 replacement group."

One or both of the C atoms may also in the 4-5 positions have attached thereto one or more of the following: H, $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic, aromatic, or mixed aliphatic-aromatic group, whether saturated or unsaturated. These I consider members of a class which may be designated, and in some of the appended claims I have identified, by the term "4-5 modifying group."

It is to be understood, however, that strongly negative groups such as $C_6H_5CO$, $CH_3CO$, or groups containing halogens, or nitro groups, may not be used in any position of the compound.

What I claim is:

1. A rubber composition having incorporated therein a compound having a nucleus of the following formula:

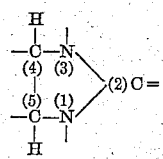

in which to the 1-3-4-5 positions may be attached any member of the group consisting of hydrogen hydrocarbon residues, and furyl residues, to the 2 position any member of the group consisting of hydrogen, sulfur, hydrocarbon residues and furyl residues, said compound containing no strongly negative groups.

2. The composition described in claim 1, in which to the 1-3 position are attached aryl hydrocarbon residues.

3. The composition described in claim 1, in which to the 2 position is attached an alkyl residue.

4. The composition described in claim 1, in which to the 1-3 positions are attached aryl hydrocarbon residues, and to the 2 position, an alkyl residue.

5. A rubber composition having incorporated therewith a tetrahydroglyoxaline containing no strongly negative groups and having as substituents two aryl hydrocarbon radicals.

6. A rubber composition including a tetrahydroglyoxaline containing no strongly negative groups and having as substituents in the 1-3 positions, aromatic hydrocarbon residues, in one of the 2-4-5 positions, an aliphatic hydrocarbon residue.

7. A rubber composition including therein a tetrahydroglyoxaline containing no strongly negative groups and having as substituents in the 1-3 positions, aromatic hydrocarbon residues, in at least one of the 2-4-5 positions, an aliphatic hydrocarbon residue, and in another of the said positions, an aryl hydrocarbon residue.

8. A rubber composition including a tetrahydroglyoxaline having no strongly negative groups, wherein aryl hydrocarbon residues are substituted in the 1-3 positions and in at least one of the 2-4-5 positions.

9. A rubber composition including a tetrahydroglyoxaline having no strongly negative groups wherein aromatic hydrocarbon residues are substituted in the 1-3 positions, and an aliphatic hydrocarbon residue in the 2 position.

10. A rubber composition including a tetrahydroglyoxaline having no strongly negative groups, wherein aryl hydrocarbon residues are substituted in the 1-3 positions and an aliphatic hydrocarbon residue in at least one of the 4-5 positions.

11. The composition described in claim 1, in which one of the carbon atoms in the 4-5 positions has an additional hydrogen atom attached hereto.

12. The composition described in claim 1, wherein each of the carbon atoms in the 4-5 positions has two hydrogen atoms attached thereto.

13. A rubber composition including a tetra hydroglyoxaline having no strongly negative groups wherein the carbon atom in the 2 position has attached thereto a radical which is a member of the "2 modifying group", substantially as described.

14. A rubber composition including a tetra hydroglyoxaline having no strongly negative groups wherein the carbon atom in the 2 position has attached thereto an aliphatic hydrocarbon radical.

15. A rubber composition including a tetra hydroglyoxaline having no strongly negative groups wherein the carbon atom in the 2 position has attached thereto a propyl radical.

16. A rubber composition including a tetra hydroglyoxaline having no strongly negative groups wherein one of the H atoms attached to the N atoms in the 1-3 positions is replaced by a radical which is a member of the "1-3 replacement group."

17. A rubber composition including a tetra hydroglyoxaline having no strongly negative groups wherein at least one of the H atoms attached to the N atoms in the 1-3 positions is replaced by an aliphatic hydrocarbon radical.

18. A rubber composition including a tetra hydroglyoxaline having no strongly negative groups wherein one of the H atoms attached to the N atoms in the 1-3 positions is replaced by an aromatic hydrocarbon radical.

19. A rubber composition including a tetra hydroglyoxaline having no strongly negative groups wherein one of the H atoms attached to the N atoms in the 1-3 positions is replaced by a phenyl radical.

20. A rubber composition including a tetra hydroglyoxaline having no strongly negative groups wherein both hydrogen atoms attached to the N atoms in the 1-3 positions are replaced by a radical which is a member of the "1-3 replacement group."

21. A rubber composition including a tetra hydroglyoxaline having no strongly negative groups wherein both hydrogen atoms attached to the N atoms in the 1-3 positions are replaced by an aromatic hydrocarbon radical.

22. A rubber composition including a tetra hydroglyoxaline having no strongly negative groups wherein both hydrogen atoms attached to the N atoms in the 1-3 positions are replaced by a phenyl radical.

23. A rubber composition including a tetra hydroglyoxaline having no strongly negative groups wherein one of the carbon atoms in the 4-5 positions has a radical attached thereto which is a member of the "4-5 modifying group."

24. A rubber composition including a tetra hydroglyoxaline having no strongly negative groups wherein one of the carbon atoms in the 4-5 positions has two radicals attached thereto which are members of the "4-5 modifying group."

25. A rubber composition including a tetra hydroglyoxaline having no strongly negative groups wherein both of the carbon atoms in the 4-5 positions have a radical attached thereto which is a member of the "4-5 modifying group."

26. A rubber composition including a tetra hydroglyoxaline having no strongly negative groups wherein both of the carbon atoms in the 4-5 positions have two radicals attached thereto which are members of the "4-5 modifying group."

27. A rubber composition including 1-3 diphenyl 2-propyl tetra hydroglyoxaline.

28. A rubber composition having incorporated therewith a substituted hydroglyoxaline containing no strongly negative groups.

29. A rubber composition having incorporated therewith dihydroglyoxaline containing no strongly negative groups.

30. A rubber composition having incorporated therewith a substituted tetrahydroglyoxaline containing no strongly negative groups.

31. The method of improving the aging qualities of rubber products which comprises incorporating in the rubber mix a small amount of a condensation product of an aldehyde with an alkylene diaryl diamine and subjecting the resulting mixture to vulcanization.

32. The method of improving the aging qualities of rubber products which comprises incorporating in the rubber mix a small amount of a condensation product of an aldehyde with ethylene diphenyl diamine.

33. A new rubber composition containing a condensation product of an aldehyde with an alkylene diaryl diamine.

34. A vulcanized rubber composition combined before vulcanization with a small amount of a condensation product of an aldehyde with ethylene diphenyl diamine.

35. The method of retarding deterioration of rubber which comprises treating rubber with a condensation product of a ditolyl alkylene diamine with an aldehyde.

36. An age-resisting rubber composition comprising rubber treated with a condensation product of a ditolyl alkylene diamine with an aldehyde.

37. A rubber composition having incorporated therein a hydroglyoxaline containing no strongly negative groups but having its 2-position substituted with a member of the 2-modifying group.

38. The composition of claim 37 in which the said hydroglyoxaline has at least one of the hydrogen atoms in the 1-3-positions replaced by a member of the 1-3 replacement group.

39. The composition of claim 37 in which at least one of the 4-5-positions of the hydroglyoxaline is substituted with a member of the 4-5 modifying group.

40. The composition of claim 1 wherein at least one of the 1- and 3-positions is substituted with a member of the 1-3 replacement group, the 2-position is substituted with a member of the 2-modifying group and at least one of the 4-5 positions is substituted with a member of the 4-5 modifying group.

41. A rubber composition having incorporated therein a small proportion of 2-4-5 trifuryl di hydroglyoxaline.

42. A rubber composition having incorporated therein a small proportion of 1-3 di alpha naphthyl tetra hydroglyoxaline.

43. A rubber composition having incorporated therein a small proportion of a hydroglyoxaline selected from a class consisting of 2-4-5 trifuryl di hydroglyoxaline, 1-3 di alpha naphthyl tetra hydroglyoxaline, 1-3 diphenyl 2-propyl tetra hydroglyoxaline, 1-3 di para tolyl 2-phenyl tetra hydroglyoxaline, 1-3 diphenyl 2-propenyl tetra hydroglyoxaline, 1-3 di para tolyl 2-methyl tetra hydroglyoxaline, 1 phenyl 3-xylyl 2-thio tetra hydroglyoxaline, and 1-3 di beta naphthyl 2-phenyl 4-methyl tetra hydroglyoxaline.

HAROLD A. MORTON.